United States Patent
Kasuya

(10) Patent No.: US 11,480,090 B2
(45) Date of Patent: Oct. 25, 2022

(54) EXHAUST STRUCTURE FOR VEHICLE-MOUNTED ENGINE

(71) Applicant: ISUZU MOTORS LIMITED, Tokyo (JP)

(72) Inventor: Keisuke Kasuya, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 17/261,497

(22) PCT Filed: Jun. 19, 2019

(86) PCT No.: PCT/JP2019/024274
§ 371 (c)(1),
(2) Date: Jan. 19, 2021

(87) PCT Pub. No.: WO2020/017225
PCT Pub. Date: Jan. 23, 2020

(65) Prior Publication Data
US 2021/0317767 A1 Oct. 14, 2021

(30) Foreign Application Priority Data
Jul. 19, 2018 (JP) .............................. JP2018-135994

(51) Int. Cl.
*F01N 3/10* (2006.01)
*F01N 13/00* (2010.01)
(Continued)

(52) U.S. Cl.
CPC ............ *F01N 13/009* (2014.06); *B60K 13/04* (2013.01); *F01N 3/035* (2013.01); *F01N 3/103* (2013.01);
(Continued)

(58) Field of Classification Search
CPC ........ F01N 13/009; F01N 3/035; F01N 13/08; F01N 2340/04; F01N 2340/06
(Continued)

(56) References Cited

U.S. PATENT DOCUMENTS 10,047,674 B2 * 8/2018 Tsuda .................... F01N 13/009
2009/0151328 A1 * 6/2009 Winsor ............... F02D 41/0007
60/280

(Continued)

FOREIGN PATENT DOCUMENTS

| CN | 104285048 A | 1/2015 |
| CN | 106661989 A | 5/2017 |

(Continued)

OTHER PUBLICATIONS

English translation of Japanese Patent Application Publication No. JP 2010-43596A (Feb. 2010) (Year: 2010).*

(Continued)

*Primary Examiner* — Jason D Shanske
(74) *Attorney, Agent, or Firm* — Procopio, Cory, Hargreaves & Savitch LLP

(57) ABSTRACT

This exhaust structure for a vehicle-mounted engine has an air intake channel 3 disposed on one side of an engine main body and an exhaust channel disposed on the other side thereof, the exhaust structure for the vehicle-mounted engine comprising: a turbine of a turbocharger disposed on the other side of the engine main body and connected to the exhaust channel; a first exhaust gas purification device connected to the exhaust channel downstream of the turbine; and a second exhaust gas purification device connected to the exhaust channel 4 downstream of the first exhaust gas purification device. The first exhaust gas purification device is disposed so as to be near the rear of the turbocharger, and the second exhaust gas purification device is disposed so as (Continued)

to be near a cylinder hock on the other side of the engine main body.

7 Claims, 3 Drawing Sheets

(51) Int. Cl.
*B60K 13/04* (2006.01)
*F01N 3/035* (2006.01)
*F01N 13/08* (2010.01)

(52) U.S. Cl.
CPC .......... *F01N 13/08* (2013.01); *F01N 2250/02* (2013.01); *F01N 2340/04* (2013.01); *F01N 2340/06* (2013.01)

(58) Field of Classification Search
USPC .......................................................... 60/299
See application file for complete search history.

(56) References Cited

U.S. PATENT DOCUMENTS

| | | | | |
|---|---|---|---|---|
| 2009/0301068 | A1* | 12/2009 | Fujita | F01N 3/208 60/286 |
| 2010/0000203 | A1 | 1/2010 | Kowada | |
| 2010/0126153 | A1* | 5/2010 | Nagafuchi | F01N 13/001 60/299 |
| 2010/0326054 | A1 | 12/2010 | Kato | |
| 2011/0197850 | A1* | 8/2011 | Kawano | F02M 69/046 123/294 |
| 2014/0202136 | A1 | 7/2014 | Sprute | |
| 2014/0352297 | A1 | 12/2014 | Spengel et al. | |
| 2015/0128566 | A1 | 5/2015 | Osumi | |
| 2015/0240750 | A1 | 8/2015 | Tsuda et al. | |
| 2015/0330279 | A1* | 11/2015 | Melecosky | B01D 53/9477 60/299 |
| 2016/0090896 | A1* | 3/2016 | Takahashi | F01P 3/20 123/41.08 |
| 2016/0230640 | A1* | 8/2016 | Kamimura | F01M 11/02 |
| 2017/0152779 | A1 | 6/2017 | Nagaoka et al. | |
| 2019/0003366 | A1* | 1/2019 | Kimura | F02D 41/1454 |
| 2019/0376436 | A1* | 12/2019 | van den Heuvel | F01N 3/2889 |
| 2019/0383197 | A1* | 12/2019 | Jang | F01N 13/008 |
| 2020/0040995 | A1* | 2/2020 | Fushimi | F16J 9/22 |

FOREIGN PATENT DOCUMENTS

| | | |
|---|---|---|
| FR | 2856735 A1 | 12/2004 |
| JP | 2002285836 A | 10/2002 |
| JP | 2007-085292 A | 4/2007 |
| JP | 2008196328 A | 8/2008 |
| JP | 2010043596 A * | 2/2010 |
| JP | 2011012563 A | 1/2011 |
| JP | 2014104393 A | 6/2014 |
| JP | 2015509160 T | 3/2015 |
| JP | 2015161225 A | 9/2015 |
| JP | 2015194117 A | 11/2015 |
| WO | 2012110720 A1 | 8/2012 |

OTHER PUBLICATIONS

International Search Report and Written Opinion for related PCT App No. PCT/JP2019/024274 dated Jul. 23, 2019, 9 pgs. (partial translation).
The State Intellectual Property Office of People's Republic of China, The First Office Action, Application No. 201980048005.2, dated Dec. 1, 2021, in 19 pages.
The State Intellectual Property Office of People's Republic of China, The Second Office Action, Application No. CN 201980048005.2, dated May 24, 2022, in 18 pages.

* cited by examiner

[Fig. 1]
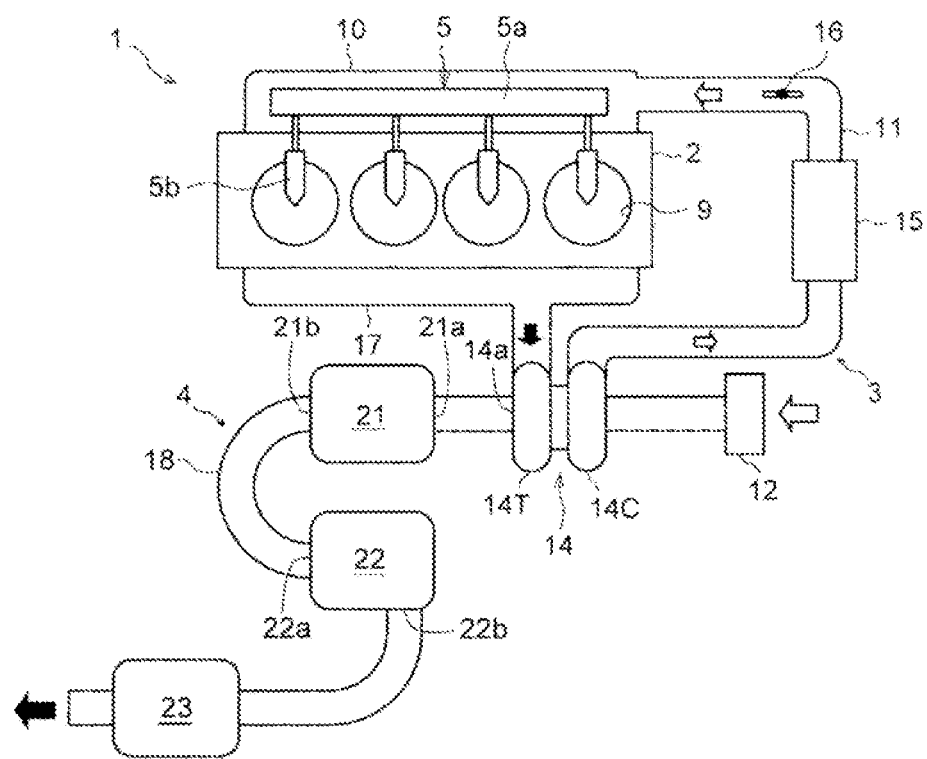

[Fig. 2]
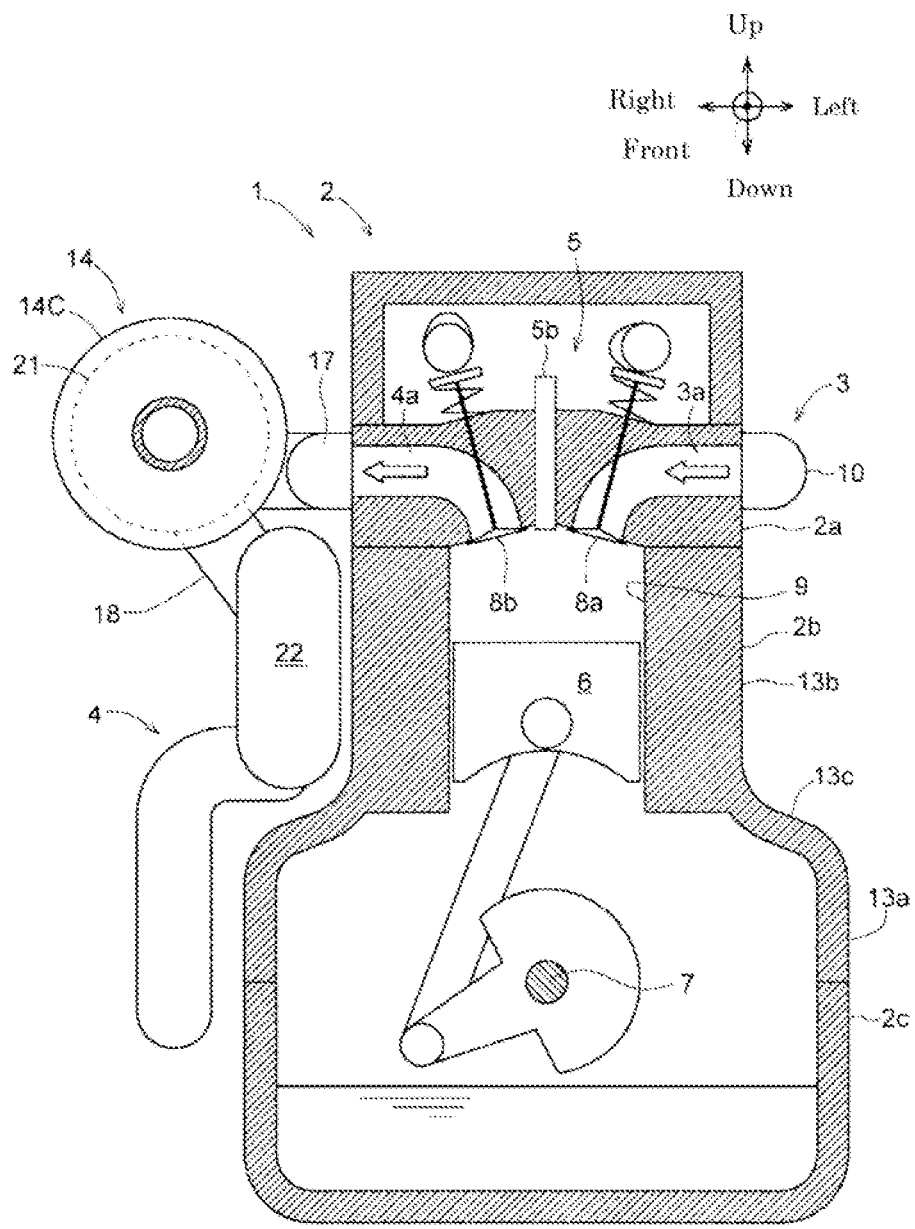

[Fig. 3]
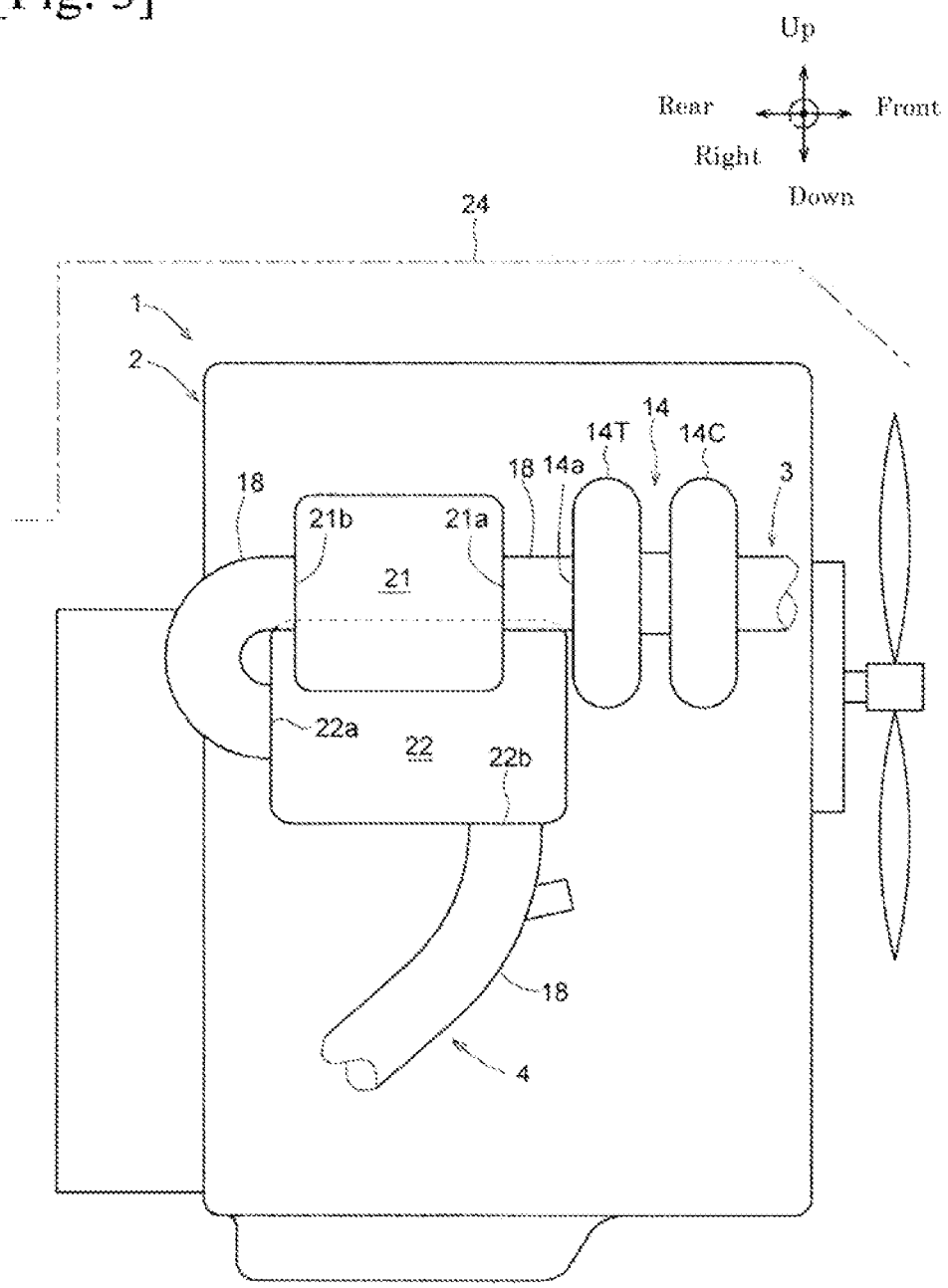

EXHAUST STRUCTURE FOR VEHICLE-MOUNTED ENGINE

CROSS-REFERENCE TO RELATED APPLICATIONS

This application is a U.S. National Stage entry of PCT Application No: PCT/JP2019/024274 filed Jun. 19, 2019, which claims priority to Japanese Patent Application No. 2018-135994 filed Jul. 19, 2018, the contents of which are incorporated herein by reference.

TECHNICAL FIELD

The present disclosure relates to an exhaust structure of a vehicle-mounted engine.

BACKGROUND ART

An exhaust pipe of a vehicle-mounted engine is provided with an, exhaust gas purification device for detoxifying exhaust gas. As such an exhaust gas purification device, an oxidation catalyst, a $NO_x$ catalyst, a particulate filter, and the like have been known.

CITATION LIST

Patent Literature

Patent Literature 1: JP-A-2015-161225
Patent Literature 2: JP-A-2002-285836
Patent Literature 3: JP-A-2014-104393
Patent Literature 4: JP-A-2008-196328

SUMMARY OF INVENTION

Technical Problem

Incidentally, the exhaust gas purification device exhibits a desired performance by setting a temperature of the exhaust gas purification device to be equal to or higher than a catalyst activation temperature. For this reason, when the temperature of the exhaust gas purification device is lower than the catalyst activation temperature, post injection or exhaust pipe injection is performed to raise the temperature of the exhaust purification device to be equal to or higher than the catalyst activation temperature. The number of injections and an injection amount thereof are determined in accordance with the temperature of the exhaust gas purification device.

However, since the post injection or the exhaust pipe injection leads to deterioration in fuel consumption, it is preferable to keep the post injection or the exhaust pipe injection to a minimum level as necessary, and it is desired to maintain the exhaust gas purification device at a high temperature for that purpose.

Accordingly, the present disclosure has been made in view of the above circumstances, and an object thereof is to provide an exhaust structure of a vehicle-mounted engine whose exhaust gas purification device is easily maintained at a high temperature.

Solution to Problem

According, to one aspect of the present disclosure, there is provided an exhaust structure of a vehicle-mounted engine in which an intake passage is disposed on one side of an engine body and an exhaust passage is disposed on the other side, and the exhaust structure includes:

a turbine of a turbocharger that is disposed on the other side of the engine body and connected to the exhaust passage;

a first exhaust gas purification device that is provided in an exhaust passage on a downstream side of the turbine;

a second exhaust gas purification device that is provided in an exhaust passage on a downstream side of the first exhaust gas purification device, in which the first exhaust gas purification device is disposed close to the rear of the turbocharger in a vehicle front-rear direction, and the second exhaust gas purification device is disposed close to a cylinder block on the other side of the engine body.

It is preferable that the first exhaust gas purification device is formed to be overlapped with the turbocharger and hidden by the turbocharger when the turbocharger is viewed from the front.

It is preferable that a lower portion of the cylinder block is formed to protrude more laterally than an upper portion of the cylinder block, and the second exhaust gas purification device is disposed close to an upper side of a step portion between the upper portion and the lower portion of the cylinder block.

It is preferable that an exhaust manifold is provided on the other side of the engine body, and the second exhaust gas purification device is disposed to be surrounded by the cylinder block, the step portion, and the exhaust manifold.

It is preferable that the turbocharger is disposed on a front side of the engine body, and the first exhaust gas purification device is disposed on a rear side of the engine body.

It is preferable that the second exhaust gas purification device is disposed on the rear side of the engine body and disposed below the first exhaust gas purification device.

It is preferable that the first exhaust gas purification device is configured with an oxidation catalyst.

It is preferable that the second exhaust gas purification device is configured with a $NO_x$ catalyst.

Advantageous Effects of Invention

According to the above aspect, an exhaust gas purification device is easily maintained at a high temperature.

BRIEF DESCRIPTION OF DRAWINGS

FIG. 1 is a schematic illustrative diagram of a vehicle-mounted engine according to an embodiment of the present disclosure.

FIG. 2 is a from view of the engine as viewed from the front of a vehicle.

FIG. 3 is a side view on an exhaust side of the engine.

DESCRIPTION OF EMBODIMENTS

An embodiment of the present disclosure will be described below with reference to the accompanying drawings. Note that front, rear, left, right, upper, and lower directions in the embodiment to be described below refer to respective directions of a vehicle.

FIG. 1 is a schematic illustrative diagram of an engine 1 according to the present disclosure. FIG. 2 is a front view of the engine 1 as viewed from the front of the vehicle. The engine (internal combustion engine) 1 is a multi-cylinder compression-ignition internal combustion engine mounted on a vehicle, that is, a diesel engine. Although the illustrated example shows an in-line four-cylinder engine, an arrangement form of cylinders of an engine, the number of cylinders, and the like are optional.

As shown in FIGS. 1 and 2, the engine 1 includes an engine body 2, an intake passage 3 and an exhaust passage. 4 that are connected to the engine body 2, and a fuel injection device 5. The engine body 2 includes structural components such as a cylinder head 2a, a cylinder block 2b, a crankcase 2c, and movable components, such as a piston 6, a crankshaft 7, an intake valve 8a, and an exhaust valve 8h, which are housed inside the engine body 2. A lower portion 13a of the cylinder block 2b protrudes more laterally than an upper portion 13b of the cylinder block 2b. Then, a step portion 13c is formed between the upper portion 13b and the lower portion 13a of the cylinder block 2b.

The fuel injection device 5 is composed of a common rail fuel injection device. The fuel injection device 5 includes a common rail 5a that stores fuel in a high-pressure state, and an injector 5b that is connected to the common rail 5a. The injector 5b is a fuel injection valve and is provided in each cylinder. The injector 5b directly injects high-pressure fuel, which is supplied from the common rail 5a, into the cylinder 9.

The intake passage 3 is disposed on one side of the engine body 2 (a left side of the vehicle). The intake passage 3 is mainly defined by an intake manifold 10 provided on the engine body 2 (in particular, the cylinder head 2a), and an intake pipe 11 connected to the intake manifold 10. The intake manifold 10 is connected to an intake pun 3a of each cylinder and distributes and supplies intake air, which is sent from the intake pipe 11, to the intake port 3a of each cylinder. The intake pipe 11 is provided with an air cleaner 12, a compressor 14C of a turbocharger 14, an intercooler 15, and an electronically controlled intake throttle valve 16 in this order from an upstream side.

The exhaust passage 1 is disposed on the other side of the engine body 2 (a right side of the vehicle). The exhaust passage 4 is mainly defined by an exhaust manifold 17 provided in the engine body 2 (in particular, the cylinder head 2a), and an exhaust pipe 18 connected to the exhaust manifold 17. The exhaust manifold 17 is connected to an exhaust port 4a of each cylinder and collects exhaust gas sent from the exhaust ports 4a. A turbine 14T of the turbocharger 14 is provided between the exhaust manifold 17 and the exhaust pipe 18.

In addition, the exhaust pipe 18 on a downstream side from the turbine 14T is provided with a first exhaust gas purification device 21, a second exhaust gas purification device 22, and a third exhaust gas purification device 23 in this order from an upstream side. The first exhaust gas purification device 21 is configured with, an oxidation catalyst (diesel oxidation catalyst (DOC)). The second exhaust purification device 22 is configured with a $NO_x$ catalyst. The third exhaust purification device 23 is configured with a particulate filter (hereinafter, referred to as a "DPF").

The oxidation catalyst as the first exhaust purification device 21 oxidizes and purifies unburned components (hydrocarbons HC and carbon monoxide CO) in exhaust gas.

The oxidation catalyst is formed such that a large number of noble metals such as platinum are dispersed in a coating material on a surface of a base material. The oxidation catalyst has a function of raising a temperature of the exhaust gas by heating the exhaust gas with heat generated during oxidation of HC and CO. As a result, the activation of the DPF and the $NO_x$ catalyst at subsequent positions can be promoted. In particular, in the case of a diesel engine, combustion is performed in a state in which oxygen is excessive, an air excess ratio λ is greater than and an exhaust gas temperature is relatively low. For this reason, the DPF and the $NO_x$ catalyst at the subsequent positions are hardly activated. In order to promote the activation, the oxidation catalyst is also provided.

The oxidation catalyst also has a function of oxidizing NO in the exhaust gas into $NO_2$. $NO_2$ has an oxidation ability higher than NO, so that the function is advantageous for oxidizing and removing, at a lower temperature, particulate matters (PM) collected in the DPF at the subsequent position. In addition, $NO_2$ is mare likely to be reduced at a low temperature than NO, so that the function is advantageous for improving a reduction efficiency in particular, a reduction efficiency at a temperature lower than an activation start temperature (a low-temperature state)) of the $NO_x$ catalyst at the subsequent position. The oxidation catalyst is preferably configured such that a ratio of $NO/NO_2$ in the exhaust gas to be discharged from the first exhaust purification device to be a value (for example, ½=0.5) at which the reduction efficiency of the $NO_x$ catalyst is highest.

The $NO_x$ catalyst as the second exhaust purification device 22 is a catalyst for purifying nitrogen oxide $NO_x$ in the exhaust was. The $NO_x$ catalyst is a selective catalytic reduction (SCR) $NO_x$ catalyst and can continuously reduce $NO_x$ when a reducing agent is added.

Examples of the $NO_x$ catalyst include: a catalyst in which a noble metal such as Pt is supported on a surface of a base material such as zeolites and alumina; a catalyst in which a transition metal such as Cu is supported on a surface of a base material by ion exchange; a catalyst in which a titania/vanadium catalyst ($V_2O_5/WO_3/TiO_2$) is supported on a surface of a base material; and the like. The $NO_x$ catalyst reduces and purifies $NO_x$ when the catalyst temperature (catalyst bed temperature) is in an active temperature range and urea water is added thereto. When the urea water is added thereto, the urea water is hydrolyzed on the catalyst, and ammonia is generated. The ammonia reacts with $NO_x$ to reduce $NO_x$.

The DPF as the third exhaust purification device 23 is composed of a so-called continuous regeneration catalytic DPF. The DPF collects particulate matters contained in the exhaust gas and continuously combusts and removes the collected particulate matters.

The shape and arrangement of the turbocharger 14, the first exhaust gas purification device 21, and the second exhaust gas purification device 22 will now be described.

As shown in FIGS. 2 and 3, the turbocharger 14 extends in a front-rear direction and is formed in a substantially circular cross section. The turbine 14T and the compressor 14C of the turbocharger 14 are formed to have substantially the same diameter. An intermediate portion of the turbocharger 14 between the turbine 14T and the compressor 14C is formed to have a diameter smaller than that of the turbine 14T and the compressor 14C. In addition, the turbocharger 14 is disposed on a front side on the other side (right side) of the engine body 2. Additionally, in the turbocharger 14, the compressor 14C is located on the font side, and the turbine 14T is located on a rear side. An outlet 14a of the turbine 14T is formed rearward at a rear end of the turbocharger 14.

The first exhaust gas purification device 21 extends in a front-rear direction and is formed in a substantially cylindrical shape. In the illustrated example, the first exhaust gas purification device 21 is formed to have a diameter smaller than that of the turbine 14T and the compressor 14C of the turbocharger 14. Additionally, the first exhaust gas purification device 21 is formed to have a diameter larger than a diameter of the exhaust passage connecting the first exhaust gas purification device 21 and the turbine 14T. Note that the first exhaust gas purification device 21 may be formed to have a diameter larger than that of the turbine 14T and the compressor 14C of the turbocharger 14. Additionally, the first exhaust gas purification device 21 is disposed coaxially with the turbine 14T and disposed close to a rear side of the turbine 14T, and is disposed close to the exhaust manifold 17. As a result, the first exhaust gas purification device 21 is located so as to be hidden behind the turbine 14T relative to a traveling wind that blows rearward from the front of the vehicle. Note that the shape of the first exhaust gas purification device 21 is not limited to a cylindrical shape and may be any shape. It is preferable that, when the turbocharger 14 is viewed from the front, most parts of the first exhaust gas purification device 21, which are overlapped with the turbocharger 14 as much as possible, are hidden.

The first exhaust was purification device 21 includes an inlet 21a at a front end thereof and an outlet 21b at a rear end thereof. The inlet 21a of the first exhaust gas purification device 21 is coaxially connected to the outlet 14a of the turbine 14T via the exhaust pipe 18 extending in the front-rear direction. Additionally, the inlet 21a of the first exhaust gas purification device 21 may be directly connected to the outlet 14a of the turbine 14T.

The second exhaust gas purification device 22 is formed in a flat shape whose dimension in the left-right direction is smaller than a dimension in the up-down direction and a dimension in the front-rear direction. In addition, the second exhaust gas purification device 22 is disposed close to the cylinder block 2b on the rear side of the other side (right side) of the engine body 2. Furthermore, the second exhaust gas purification device 22 is disposed close to an upper side of the step portion 13c of the cylinder block 2b. Additionally, the second exhaust gas purification device 22 is disposed close to the exhaust manifold 17. Then, the second exhaust gas purification device 22 is disposed to be surrounded by the cylinder block 2b, the step portion 13c, and the exhaust manifold 17.

In general, a rear portion of an exhaust side of the engine body 2 is a part where heat is easily accumulated, and tends to be a dead space that is hard to be used in a layout. However, the second exhaust gas purification device 22 is held in the cylinder block 2b, the step portion 13c, and the exhaust manifold 17 as described above, so that the dead space can be effectively used, and the second exhaust gas purification device 22 can be maintained at a relatively high temperature.

The second exhaust gas purification device 22 includes an inlet 22a at a rear end thereof and an outlet 22b at a lower front end thereof. The inlet 22a of the second exhaust gas purification device 22 is connected to the outlet 21b of the first exhaust gas purification device 21 via the exhaust pipe 18 bent in a U shape. In addition, the exhaust pipe 18 connected to the outlet 22b of the second exhaust gas purification device 22 extends downward and is bent rearward Note that a dash-dotted line in FIG. 3 indicates a bottom surface 24 of a cab.

Next, an operation of the present embodiment will be described.

When the engine 1 is operated, fuel is combusted in each cylinder of the engine body 2, and high-temperature exhaust gas is discharged to the exhaust port 4a. As a result, the temperature of the other side (the exhaust side) of the engine body 2 is high. In addition, the exhaust gas flows from the exhaust port 4a to the exhaust manifold 17 and the turbine 14T in this order. As a result, the temperature of the exhaust manifold 17 is high. Further, the compressor 14C is operated. The exhaust gas consumes energy by driving the turbine 14T. As a result, the temperature of the exhaust gas slightly decreases. Then, the exhaust gas flows through the first exhaust gas purification device 21, the second exhaust gas purification device 22, and the third exhaust gags purification device 23 in this order In this case, the first exhaust gas purification device 21 is disposed close to the exhaust manifold 17 and the turbine 14T. For this reason, the first exhaust gas purification device 21 receives radiant heat from the exhaust manifold 17 and the turbine 14T. In addition, the first exhaust gas purification device 21 is firmed to have a diameter smaller than that of the turbine 14T of the turbocharger 14, and is disposed close to the rear of the turbine 14T. For this reason, the first exhaust gas purification device 21 is hidden behind the turbine 14T relative to a traveling wind, and the traveling wind is unlikely to hit the first exhaust gas purification device 21. In addition, an upper side of the engine 1 is covered with the bottom surface 24 of the cab. For this reason, the traveling wind flows around the engine 1 from the front to the rear, and does not hit the first exhaust gas purification device 21. For this reason, the first exhaust purification device 21 is easily maintained, at a high temperature by the radiant heat from the exhaust manifold 17 and the turbine 14T while being prevented from dissipating heat. Therefore, it is possible to prevent or inhibit the temperature of the first exhaust gas purification device 21 from being lower than the catalyst activation temperature. Then, even when the temperature of the first exhaust gas purification device 21 is lower than the catalyst activation temperature, and the post injection or the exhaust pipe injection (when an exhaust pipe injection valve is provided) is required to raise the temperature of the first exhaust gas purification device 21, the injection amount can be inhibited and the fuel efficiency can be improved.

In addition, the second exhaust gas purification device 22 is disposed close to and is surrounded by the cylinder block 2b an the rear side of the other side (the right side) of the engine body 2, the step portion 13c, and the exhaust manifold 17. Furthermore, the second exhaust gas purification device 22 is formed in a flat shape whose dimension in the left-right direction is smaller than the dimension in the up-down direction and the dimension in the front-rear direction. For this reason, the second exhaust gas purification device 22 can receive the radiant heat from the cylinder block 2b, the step portion 13c, and the exhaust manifold 17 in a wide area, and is easily maintained at a high temperature. Therefore, it is possible to prevent or inhibit the temperature of the second exhaust gas purification device 22 from being the catalyst activation temperature or lower. Then, even when the temperature of the second exhaust gas purification device 22 is lower than the catalyst activation temperature, and the post injection or the exhaust pipe injection (when an exhaust pipe injection valve is provided) is required to raise the temperature of the second exhaust gas purification device 22, the injection amount can be inhibited and the fuel efficiency can be improved.

Although the embodiment of the present disclosure has been described in detail above, the present disclosure also allows other embodiments as follows.

For example, the first exhaust gas purification device 21 is configured with an oxidation catalyst, and the second exhaust gas purification device 22 is configured with a $NO_x$ catalyst, but the present invention is not limited to this example. The first exhaust gas purification device 21 and the second exhaust gas purification device 22 may be configured with another exhaust gas purification device that is preferably maintained, at a high temperature, such as a particulate filter.

The embodiment of the present disclosure is not limited to the embodiment described above, and all modifications, applications, and equivalents, which fall within the concept of the present disclosure as defined by the claims, are included in the present disclosure. Accordingly, the present disclosure should not be construed as limited, and can be applied to any other technique belonging to the scope of the concept of the present disclosure.

The present application is based on Japanese Patent Application (No. 2018-135994) filed on Jul. 19, 2018, contents of which are incorporated herein as reference.

INDUSTRIAL APPLICABILITY

The present disclosure is useful in that an exhaust gats purification device can be easily maintained at a high temperature and can be applied to a vehicle-mounted engine such as a diesel engine.

REFERENCE SIGNS LIST

1 Engine
2 Engine body
2a Cylinder head
2b Cylinder block
2c Crank case
3 Intake passage
3a intake port
4 Exhaust passage
4a Exhaust port
5 Fuel injection device
5a Common rail
5b Injector
6 Piston
7 Crankshaft
8a Intake valve
8b Exhaust valve
9 Cylinder
10 Intake manifold
11 Intake pipe
12 Air cleaner
13a Lower portion
13b Upper portion
13c Step portion
14 Turbocharger
14C Compressor
14T Turbine
14a Outlet
15 Intercooler
16 Intake throttle valve
17 Exhaust manifold
18 Exhaust pipe
21 First exhaust gas purification device
21a Inlet
21b Outlet
22 Second exhaust gas purification device
22a Inlet
22b Outlet
23 Third exhaust gas purification device
24 Bottom surface

The invention claimed is:

1. An exhaust structure of a vehicle-mounted engine in which an intake passage is disposed on one side of an engine body and an exhaust passage is disposed on an other side, the exhaust structure comprising:
a turbine of a turbocharger that is disposed on the other side of the engine body and connected to the exhaust passage;
a first exhaust gas purification device that is provided in the exhaust passage on a downstream side of the turbine;
a second exhaust gas purification device that is provided in the exhaust passage on a downstream side of the first exhaust gas purification device,
wherein the first exhaust gas purification device is formed to have a diameter smaller than a diameter of the turbine of the turbocharger and larger than a diameter of the exhaust passage connecting the first exhaust gas purification device and the turbine, and is disposed close to a rear of the turbocharger in a vehicle front-rear direction,
wherein the second exhaust gas purification device is disposed close to a cylinder block on the other side of the engine body,
wherein a lower portion of the cylinder block is formed to protrude more laterally than an upper portion of the cylinder block,
wherein the second exhaust gas purification device is disposed above an upper side of a step portion between the upper portion and the lower portion of the cylinder block, and
wherein the second exhaust gas purification device is formed in a flat shape whose dimension in a vehicle left-right direction is smaller than the dimension in a vehicle up-down direction and the dimension in the vehicle front-rear direction.

2. The exhaust structure of the vehicle-mounted engine according to claim 1, wherein the first exhaust gas purification device is formed to be overlapped with the turbocharger and hidden by the turbocharger when the turbocharger is viewed from the front.

3. The exhaust structure of the vehicle-mounted engine according to claim 1, wherein an exhaust manifold is provided on the other side of the engine body, and
wherein the second exhaust gas purification device is disposed to be surrounded by the cylinder block, the step portion, and the exhaust manifold.

4. The exhaust structure of the vehicle-mounted engine according to claim 1, wherein the turbocharger is disposed on a front side of the engine body, and
wherein the first exhaust gas purification device is disposed on a rear side of the engine body.

5. The exhaust structure of the vehicle-mounted engine according to claim 4, wherein the second exhaust gas purification device is disposed on the rear side of the engine body and disposed below the first exhaust gas purification device.

6. The exhaust structure of the vehicle-mounted engine according to claim 1, wherein the first exhaust gas purification device is configured with an oxidation catalyst.

7. The exhaust structure of the vehicle-mounted engine according to claim 1, wherein the second exhaust gas purification device is configured with a $NO_x$ catalyst.

* * * * *